US009678509B2

(12) United States Patent
Sofman et al.

(10) Patent No.: US 9,678,509 B2
(45) Date of Patent: Jun. 13, 2017

(54) METHOD AND APPARATUS FOR SIMULTANEOUS LOCALIZATION AND MAPPING OF MOBILE ROBOT ENVIRONMENT

(71) Applicant: NEATO ROBOTICS, INC., Newark, CA (US)

(72) Inventors: Boris Sofman, Pittsburgh, PA (US); Vladimir Ermakov, Santa Clara, CA (US); Mark Emmerich, San Jose, CA (US); Steven Alexander, Fremont, CA (US); Nathaniel David Monson, Mountain View, CA (US)

(73) Assignee: Neato Robotics, Inc., Newark, CA (US)

( * ) Notice: Subject to any disclaimer, the term of this patent is extended or adjusted under 35 U.S.C. 154(b) by 0 days.

(21) Appl. No.: 14/543,508

(22) Filed: Nov. 17, 2014

(65) Prior Publication Data

US 2015/0105964 A1    Apr. 16, 2015

Related U.S. Application Data

(62) Division of application No. 14/067,705, filed on Oct. 30, 2013, now Pat. No. 8,903,589, which is a division
(Continued)

(51) Int. Cl.
*G05D 1/02* (2006.01)
*B25J 11/00* (2006.01)
(Continued)

(52) U.S. Cl.
CPC .......... *G05D 1/0274* (2013.01); *B25J 9/0003* (2013.01); *B25J 9/1602* (2013.01);
(Continued)

(58) Field of Classification Search
CPC ...... G06T 7/208; G01C 22/00; G05D 1/0274; G05D 2201/0215; G05D 1/0216;
(Continued)

(56) References Cited

U.S. PATENT DOCUMENTS

| 5,202,661 A | 4/1993 | Everett et al. |
| 5,363,305 A | 11/1994 | Cox et al. |

(Continued)

FOREIGN PATENT DOCUMENTS

| WO | 03040845 A1 | 5/2003 |
| WO | 2007028049 A2 | 3/2007 |
| WO | 2009012474 A1 | 1/2009 |

OTHER PUBLICATIONS

Sheng Fu et al, "SLAM for Mobile Robots Using Laser Range Finder and Monocular Vision," IEEE, 2007.

*Primary Examiner* — Abby Lin
(74) *Attorney, Agent, or Firm* — Kilpatrick Townsend & Stockton LLP

(57) ABSTRACT

Techniques that optimize performance of simultaneous localization and mapping (SLAM) processes for mobile devices, typically a mobile robot. In one embodiment, erroneous particles are introduced to the particle filtering process of localization. Monitoring the weights of the erroneous particles relative to the particles maintained for SLAM provides a verification that the robot is localized and detection that it is no longer localized. In another embodiment, cell-based grid mapping of a mobile robot's environment also monitors cells for changes in their probability of occupancy. Cells with a changing occupancy probability are marked as dynamic and updating of such cells to the map is suspended or modified until their individual occupancy probabilities have stabilized. In another embodiment, mapping is suspended when it is determined that the device is acquiring data regarding its physical environment in such a
(Continued)

way that use of the data for mapping will incorporate distortions into the map, as for example when the robotic device is tilted.

18 Claims, 15 Drawing Sheets

Related U.S. Application Data of application No. 12/873,018, filed on Aug. 31, 2010, now abandoned.

(60) Provisional application No. 61/238,597, filed on Aug. 31, 2009.

(51) Int. Cl.
*B25J 9/16* (2006.01)
*B25J 9/00* (2006.01)

(52) U.S. Cl.
CPC ......... B25J 11/0085 (2013.01); G05D 1/024 (2013.01); *G05D 2201/0203* (2013.01); *Y10S 901/01* (2013.01); *Y10S 901/47* (2013.01)

(58) Field of Classification Search
CPC ......... G05D 1/0207; G05B 2219/40506; B25J 9/0003; B25J 11/0085; B25J 5/00; Y10S 901/01; Y10S 901/47
See application file for complete search history.

(56) References Cited

U.S. PATENT DOCUMENTS

| | | |
|---|---|---|
| 5,793,934 A | 8/1998 | Bauer |
| 5,957,984 A | 9/1999 | Rencken |
| 7,769,491 B2 | 8/2010 | Fukuchi et al. |
| 2004/0076324 A1 | 4/2004 | Burl et al. |
| 2004/0167669 A1 | 8/2004 | Karlsson et al. |
| 2005/0171637 A1 | 8/2005 | Tani et al. |
| 2006/0235585 A1 | 10/2006 | Tanaka |
| 2006/0241827 A1 | 10/2006 | Fukuchi et al. |
| 2007/0061043 A1 | 3/2007 | Ermakov et al. |
| 2008/0009968 A1 | 1/2008 | Bruemmer et al. |
| 2008/0027591 A1 | 1/2008 | Lenser et al. |
| 2008/0109126 A1 | 5/2008 | Sandin et al. |
| 2008/0154834 A1* | 6/2008 | Payton .............. G06K 9/32 706/48 |
| 2010/0049391 A1 | 2/2010 | Nakano |
| 2010/0070078 A1* | 3/2010 | Kong ............... G05D 1/0274 700/259 |
| 2010/0070125 A1* | 3/2010 | Lee ................. G06T 7/0042 701/28 |

* cited by examiner

— sensing plane when robot is level
----- plane tilted when robot is tilted

METHOD AND APPARATUS FOR SIMULTANEOUS LOCALIZATION AND MAPPING OF MOBILE ROBOT ENVIRONMENT

CROSS-REFERENCE TO RELATED APPLICATION

The present application is a divisional application of U.S. application Ser. No. 14/067,705, filed Oct. 30, 2013, which is a divisional application of U.S. application Ser. No. 12/873,018, filed Aug. 31, 2010 (abandoned) which claims the benefit of U.S. provisional application Ser. No. 61/238,597, filed Aug. 31, 2009, entitled "Computation Optimization Techniques for Simultaneous Localization and Mapping". The disclosures of these applications are incorporated by reference herein in their entirety.

BACKGROUND

Aspects of the present invention relate to mobile robots, and more particularly to the mapping of environments in which mobile robots operate, to facilitate movement of mobile robots within those environments.

As a system that enables a mobile robot to map its environment and maintain working data of its position within that map, simultaneous localization and mapping (SLAM) is both accurate and versatile. Its reliability and suitability for a variety of applications make it a useful element for imparting a robot with some level of autonomy.

Typically, however, SLAM techniques tend to be computationally intensive and thus their efficient execution often requires a level of processing power and memory capacity that may not be cost effective for some consumer product applications.

For those facing the low-cost production targets necessary for competition in the consumer market, it is unlikely that an economic hardware environment would include processing and memory capacities capable of supporting adequately a robust SLAM system. It therefore is imperative that developers seek ways to facilitate efficient execution of the core SLAM algorithms within the limits of the computational capacities they have. Generally, such optimization schemes would seek to use processing power and system bandwidth judiciously, which might mean simplifying some of the SLAM algorithms in ways that do not critically compromise their performance, or reducing input data size or bandwidth.

SUMMARY OF THE INVENTION

Four concepts are outlined herein, each intended to enable a SLAM system to maintain efficiency when it is operating on a platform that provides limited processor power and/or memory capacity. Some of these optimization methods may reside entirely in software, or may require some element of hardware support to function properly.

DETAILED DESCRIPTION

1. Suspending Robot Pose Updates During Delocalization

Localization requires regularly updating a robot's pose (position and angle) within its environment. The frequency with which this is done can affect overall system performance, depending on how often data must be processed as a result of an update operation. Minimizing computational load is essential to providing a SLAM system that can function effectively in a low-cost hardware environment.

According to one feature of the invention, computational load may be reduced by eliminating robot position updates when it appears that the robot has become delocalized, in which case the updates likely would be erroneous anyway.

Figure 1:
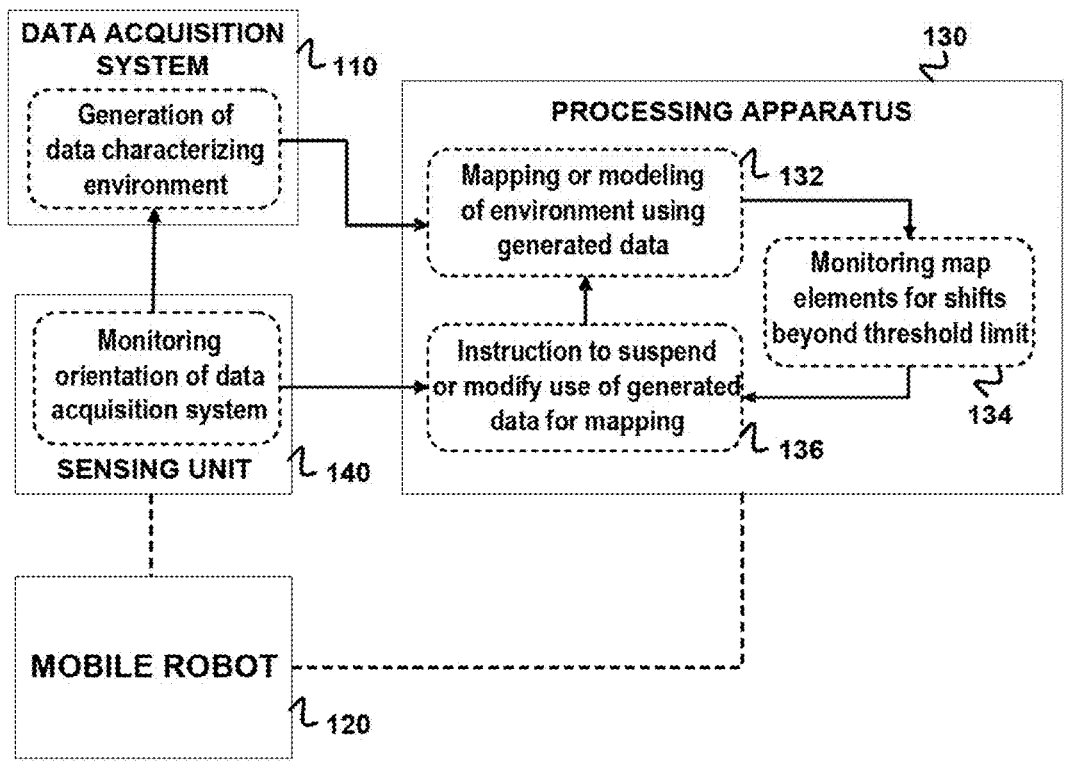
FIG. 1 depicts a block diagram of aspects of a data acquisition system in accordance with one embodiment of the present invention, relating to system orientation.

FIG. 1 is a diagram depicting aspects of the just-mentioned feature in a mobile robotic system 100. In FIG. 1, data acquisition system 110 generates data regarding the environment of mobile robot 120. This data becomes input data to processing apparatus 130. From this data, processing apparatus 130 generates a map or model of the mobile robot's environment (block 132). Processing apparatus 130 also may contain a separate function (block 134) that monitors the generation or updating of the map for any shift in map elements beyond a threshold limit. If such an occurrence is detected, the processing apparatus (block 136) responds by executing instructions to suspend or modify the use of data from data acquisition system 110. A sensing unit 140 also may monitor the data acquisition system 110 for a loss in preferred orientation of the data acquisition system 110 for data generation. If sensing unit 140 detects a loss in orientation, processing apparatus 130 will respond by executing instructions to suspend or modify use of data generated by the data acquisition system 110. Mobile robot 120 may be connected to processing apparatus 130. The sensing unit 140, if present, may be attached to the mobile robot 120. Data acquisition system 110 may be attached to the mobile robot 120 as well, or alternatively may be separate.

Figure 2:
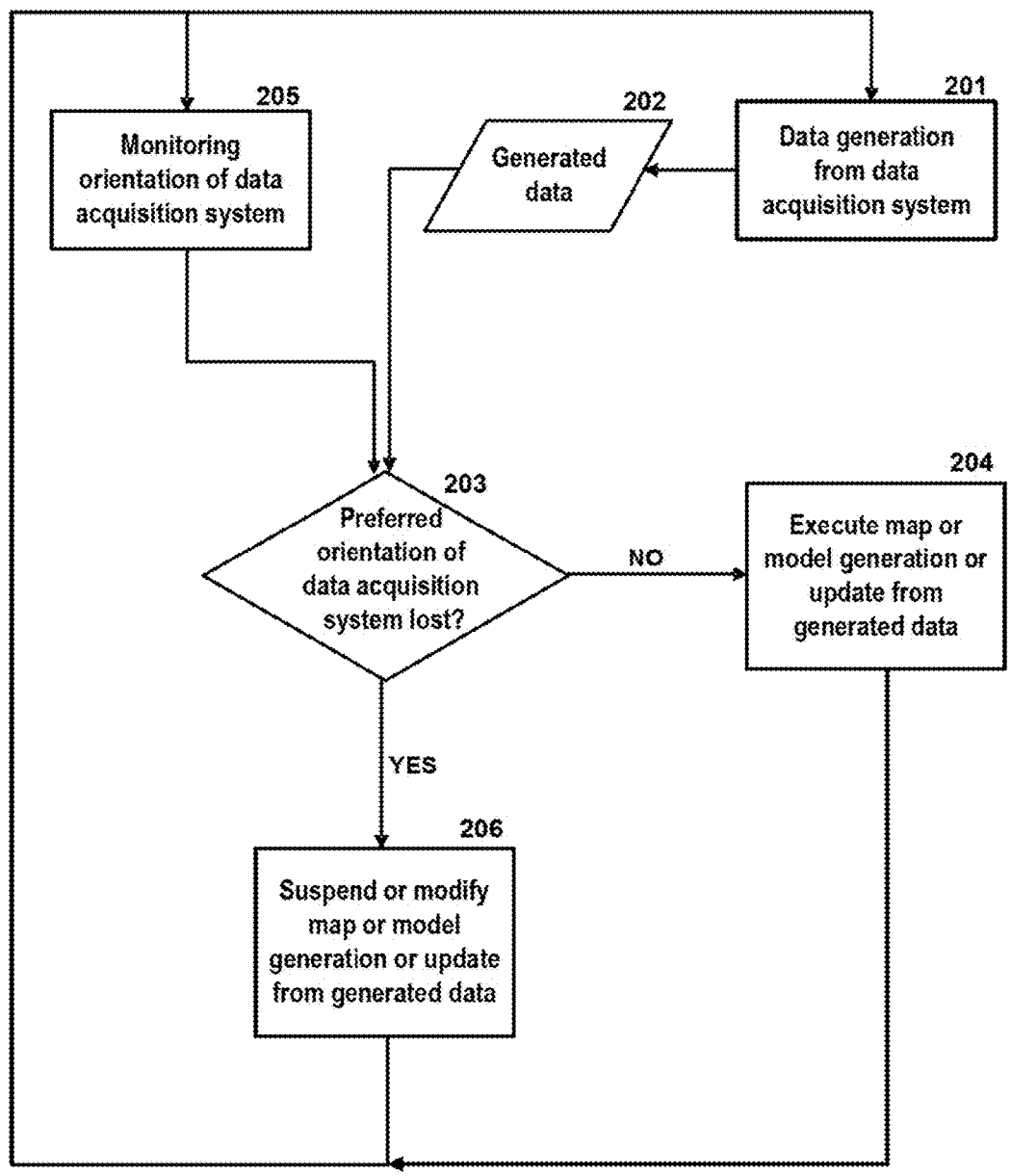
FIG. 2 depicts a flow of operation of aspects of the FIG. 1 embodiment involving reaction to system orientation.

FIG. 2 shows a flow of operation of the system depicted in FIG. 1. In FIG. 2, at block 201, the data acquisition system generates data regarding the robot's physical environment, yielding the generated data at block 202. At block 203, the orientation of the data acquisition system is monitored to see whether the data acquisition system is maintaining its preferred orientation with respect to the robot's physical environment (e.g. whether the data acquisition system is tilting, has tipped over, or otherwise seems to display an orientation other than one in which the robot can function within its physical environment. At block 204, if the preferred orientation is not lost, then at block 205, the generated data is used to generate or update the map of the robot's physical environment. On the other hand, if at block 204, if the preferred orientation is lost, then at block 206, the map generation is suspended, or the map is modified. After either block 205 or block 206, flow returns to the top of FIG. 1 to generate data and monitor the orientation of the data acquisition system.

Figure 3:
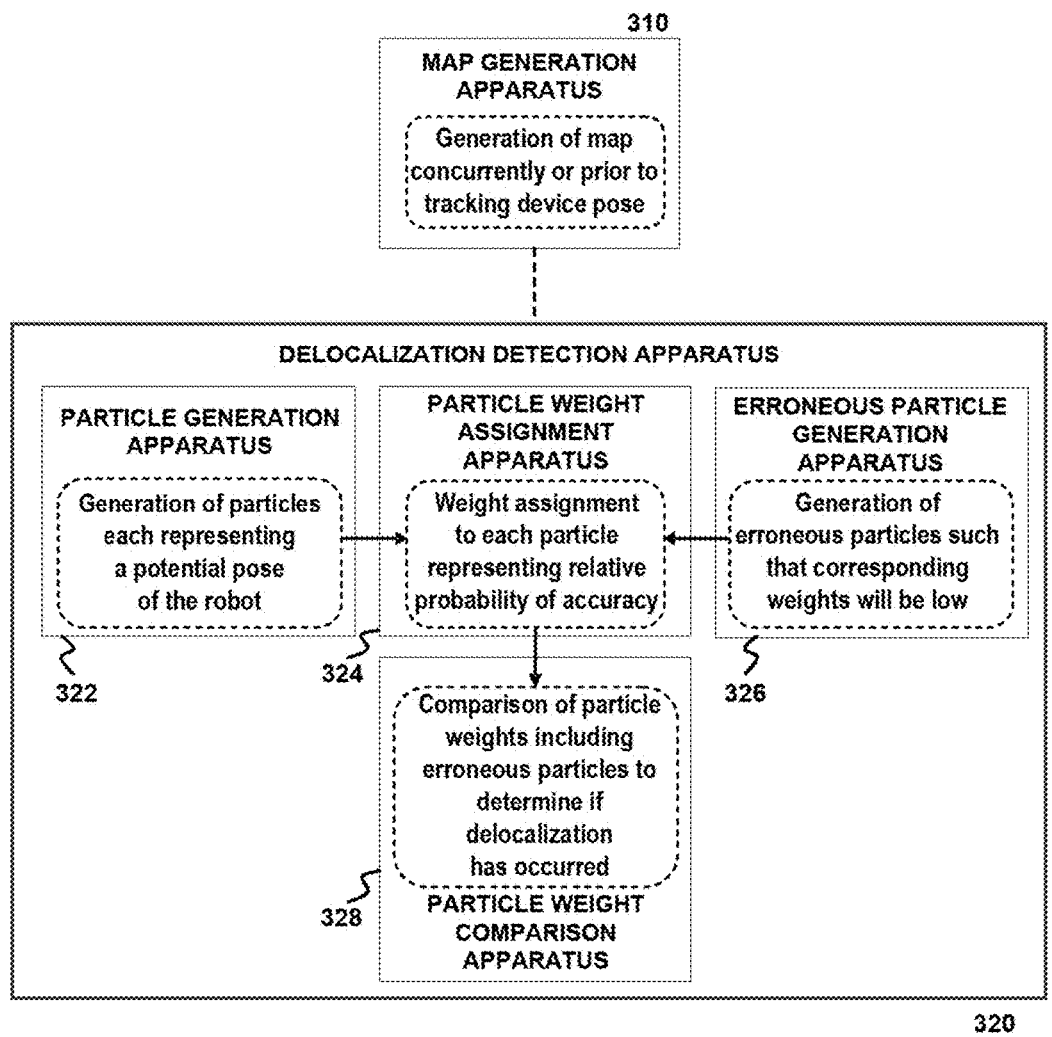
FIG. 3 depicts a block diagram of map generation and delocalization detection apparatus in accordance with one embodiment of the present invention.

FIG. 3 is a diagram showing other features of the invention. In FIG. 3, map generation apparatus 310 provides a map of a mobile device's environment for localization of the mobile device within that environment. A delocalization detection apparatus 320 uses the map information to determine the position of the device. Particle generation apparatus 322 generates particles representing potential poses of the mobile device. Particle weight assignment apparatus 324 assigns weights to each particle representing its relative likelihood of accuracy relative to other particles. Separately, an erroneous particle generation apparatus 326 generates particles such that their corresponding weights as generated by particle weight assignment apparatus 324 will be low, representing a low probability of correctly indicating the mobile device's position. A particle weight comparison apparatus 328 compares the weights of the erroneous particles with the weights of the particles generated by the particle generation apparatus 322 and confirms that the device is accurately localized or determines whether delocalization has occurred.

The method may operate as follows:
1) Erroneous position and inclination particles may be introduced to the set of tracking particles. The erroneous particles, also referred to later as verification particles, may be selected in a way that they likely will not introduce additional error into the current estimate of the robot's position and inclination.
2) Typically, erroneous particles have low weights, which may correspond generally to their low probability of accurately representing the robot's current position. If the erroneous particles have weights that are not uniformly low, but rather may be a distribution or some combination of low and high weights, then this may imply that the robot has become delocalized.
3) If it is determined that the robot likely is delocalized, then updating its position within the map of its surroundings may be suspended until the weights of the erroneous particles return to a more uniform distribution of low values.

Figure 4:
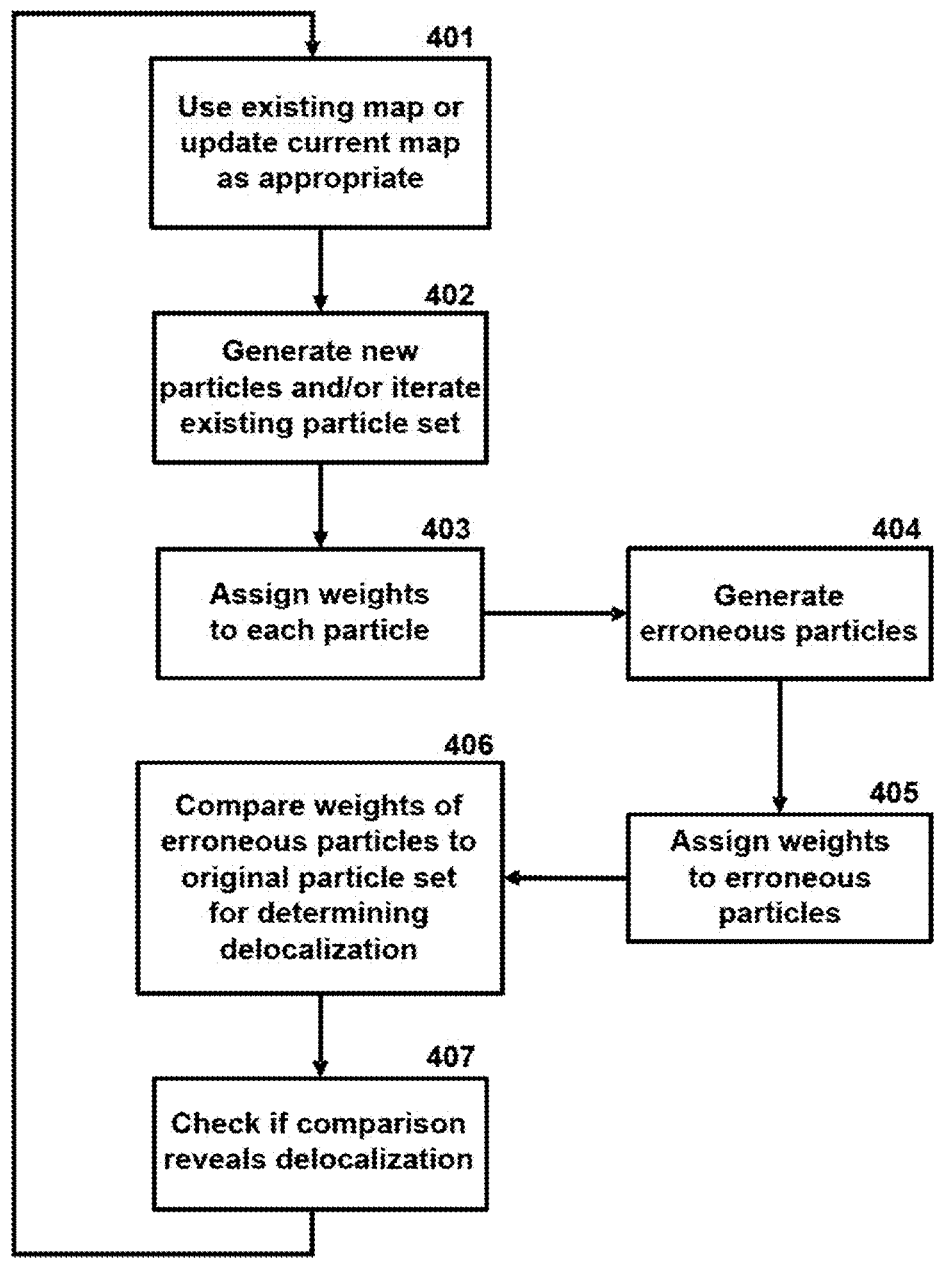
FIG. 4 depicts a flow of operation of the FIG. 3 system using particle weight comparison to detect delocalization.

FIG. 4 depicts a flow of operation of the system depicted in FIG. 3. In FIG. 4, at block 401, the existing map may be used or updated as appropriate. At block 402, particles are generated, either anew or iteratively, the iteratively generated particles being added to the existing particle set. At block 403, weights are assigned to each particle. At block 404, erroneous particles are generated, and at block 405, the erroneous particles have weights assigned to them. At block 406, the weights of the erroneous particles are compared to those of the original particle set to determine whether delocalization has occurred. At block 407, a check for delocalization is made. If delocalization has not occurred, then similarly to block 205 in FIG. 2, map generation and updating continues. If delocalization has occurred, then similarly to block 206 in FIG. 2, map generation is suspended or modified.

There are precautionary reasons why this procedure is implemented in a SLAM system and it may afford other advantages beyond computational load reduction. Suspension of mapping when delocalization is detected may avoid corrupting the map. Also, once delocalization is detected, additional actions can be enabled to improve the likelihood that the robot will re-localize, such as increasing the number of particles in the set or employing looser error models. Depending on the severity of the delocalization, other actions might be taken aside from those that are related to recovery. For example, the robot might stop or restart its run.

Example: Determining Delocalization Through Introduction of Erroneous Particles

A typical approach to localization under a SLAM scheme might include the following steps:
1) For each particle:
   a) Apply an ideal motion model (e.g., odometry).
   b) Apply position and angle $(x,y,\theta)$ adjustments drawn from error model distributions.
   c) Evaluate with respect to the current map to compute weight.
2) Resample particles proportional to computed weights.

Figure 5:
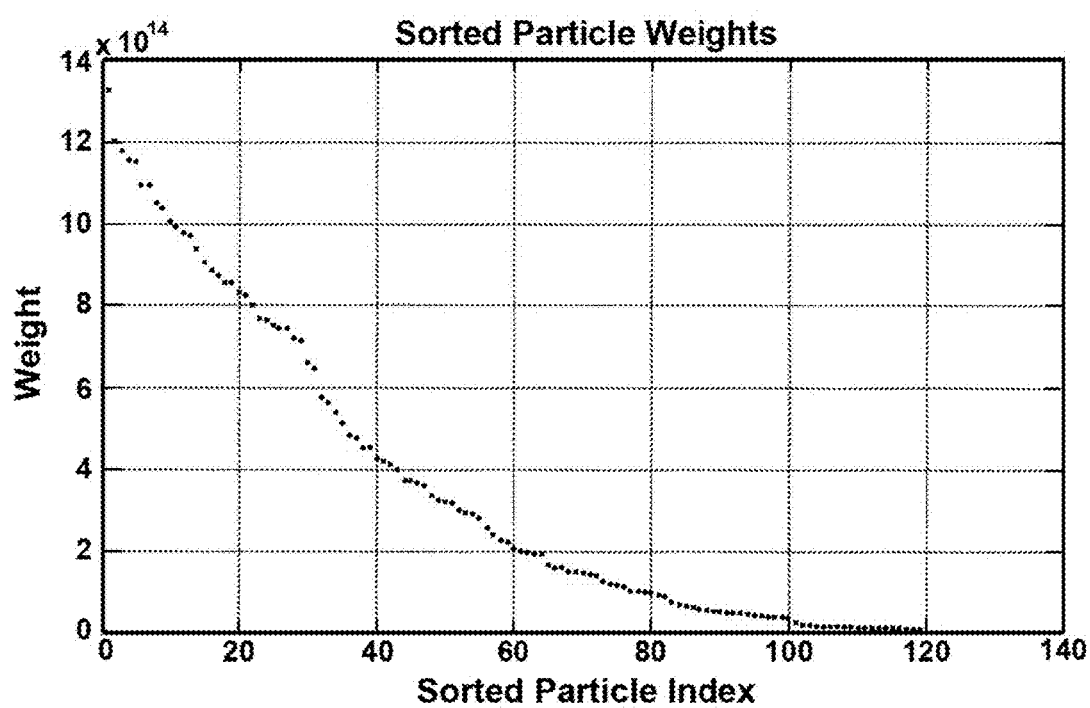
FIG. 5 depicts an example of particle weight distribution for a typical localization iteration process.

A typical localization iteration based on the above process might yield the particle weight distribution illustrated in FIG. 5.

In FIG. 5, the distribution of particles, sorted by weight, appears as a curve, indicating a mix of particles of low, middle and high weights. The particles with higher weights—those at the upper left side of the distribution—have a proportionally higher probability of representing accurately the robot's pose relative to other particles lower on the sorted distribution of weights. When the particles are indexed by their weights, a particle's index number may indicate its relative position with respect to other particles regarding its probability of accurately representing the robot's pose (position and angle). Within such a framework, particle 1 has the highest probability of accuracy and all subsequent particles (i.e., particles 2, 3, 4, etc.) have sequentially lower probabilities of accuracy in their pose.

It is worth noting that the weight scale (the vertical axis in the graph) may be highly dependent on environmental conditions such as distance from walls, number of valid distance readings from a spatial sensor such as a laser rangefinder, etc. An approach to determining delocalization via the introduction of erroneous particles generally should be independent of environmental conditions.

The goal of introducing erroneous particles is to identify when the particles with higher probability of representing the robot's pose are not much better than particles with the lowest probability of representing the robot's pose. In such a circumstance, the implication is that most or all potential poses are bad, and therefore the robot has little or no reliable information regarding its actual whereabouts within its environment. By definition, the robot is delocalized.

The process of assessing the state of localization involves introducing additional test particles whose pose is deliberately erroneous in order to set a baseline weight for comparison to better particles.

It is often observed that particle evaluation is most sensitive to angular errors. Small changes in robot angle, for example, can translate to large errors in distance measurements as the distance from the robot to an object in its surrounding environment increases. Large angular errors can have similar distributions of laser readings in terms of distance, but they may dramatically reduce the overall weight of the full particle set.

Typically, the particles representing candidate location angles with the highest weights are fairly close to an ideal motion model. Recognizing this, a generally effective approach to delocalization detection is to introduce erroneous particles at the center of the ideal motion model with large offsets to the angle (e.g., ±30°, 40°, 50°, 60°, etc.).

Figure 6:
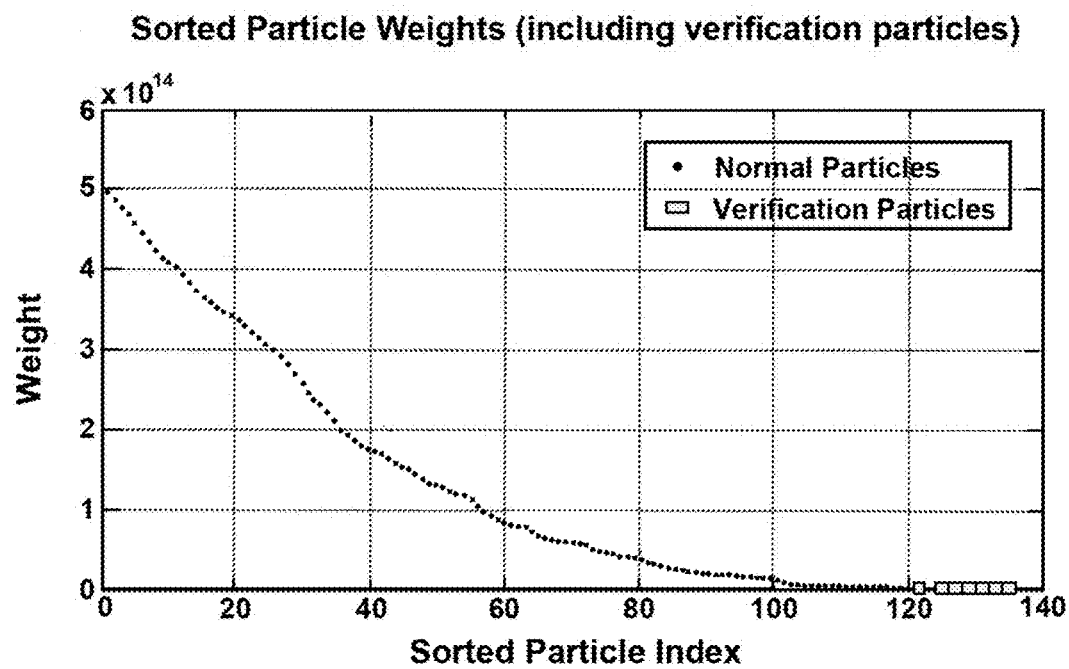
FIG. 6 depicts an example of particle weight distribution for a localization iteration process when the robot is properly localized.

If the robot is properly localized, the erroneous particles will reside relatively close together at the end of the sorted distribution curve that contains the lowest weighted particles, as shown in FIG. 6.

In FIG. 6, the erroneous particles, referred to here as verification particles for their purpose, are clustered together on the lower right end of the curve, each having a weight that is closer to zero than the particles comprising the rest of the sorted distribution.

Figure 7:
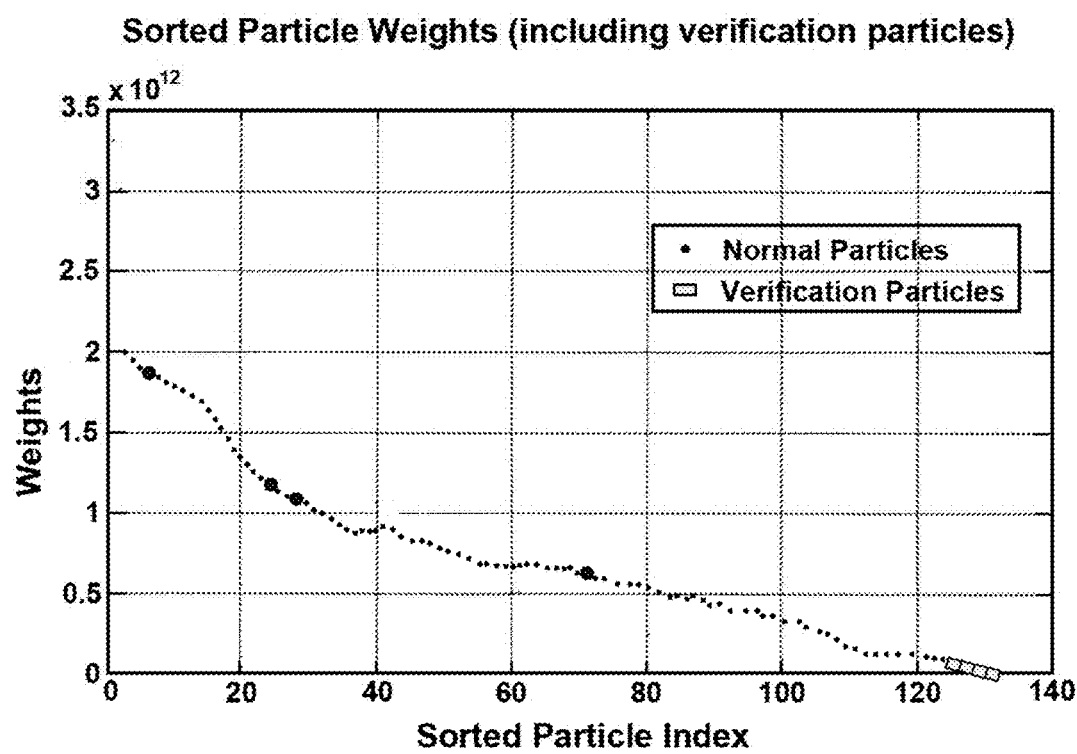
FIG. 7 depicts an example of particle weight distribution for a localization iteration process when the robot is delocalized.

If the robot is delocalized, many normal particles will have low weights, and many of these are likely to have weights lower than some of the erroneous or verification particles, as seen in FIG. 7.

In FIG. 7, some erroneous (verification) particles reside at the far right side of the distribution, but other erroneous particles are scattered through the rest of the particle set. As more particles known to be erroneous have weights that exceed other, non-verification particles, it becomes increasingly likely that the robot has delocalized.

Identifying Delocalization

The actual determination of delocalization can be done in any of a variety of ways, including by examining the mean index value of the erroneous (verification) particles. In a localized condition, most or all of the erroneous particles will reside relatively close together at the bottom of the index, since they generally will have the lowest weights. Averaging the indices of the erroneous particles in a localized case will yield a large number relative to the size of the total set of particles, including both erroneous and non-erroneous particles.

In a delocalized state, however, the erroneous particles are scattered through the distribution curve, and an indexing of particles in order of their weight will yield a set of erroneous particles whose averaged index is not necessarily high with respect to the size of the total set of particles. Generally, an average of verification particle indices that remains constant and high in value with respect to total particle set size reflects a localized condition. An average that falls in value or begins to fluctuate in value may indicate a delocalized condition.

Figure 8:
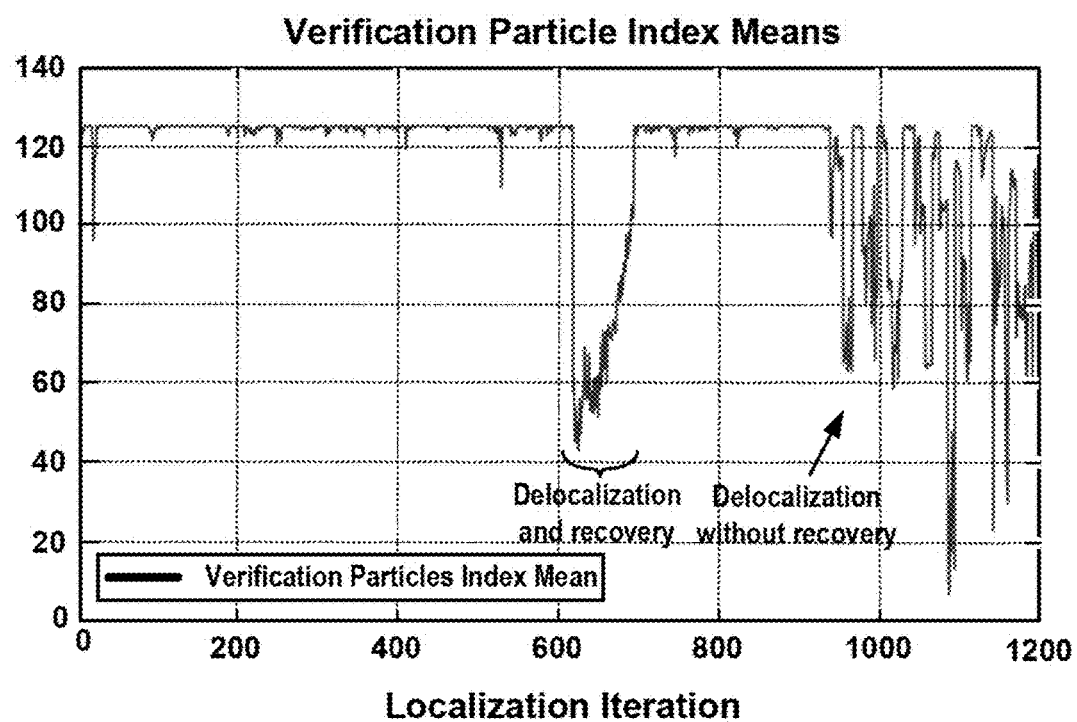
FIG. 8 depicts a plot of localized and delocalized states based on verified particle distribution data.

Both of these states, localized and delocalized, are depicted in the plots of the averaged verification particle data in FIG. 8. In this graph, the plotted data are the averaged verification particle indices. For localization iterations 1 through 600, the averaged data are high and relatively constant, which is consistent with a localized state. Shortly after iteration 600, the average value drops significantly and then recovers; in this particular data set, this drop corresponds to an engineer picking the robot up from the floor and moving it to a different location. Like the previous drops in index average, the return of the average to a high, stable number indicates that the robot likely recovered from the event.

At a point on the graph between 800 and 1000 localization iterations the data begins to fluctuate greatly. The lack of consistency in the average and the range of its variability are indicative of a delocalized condition. Unlike the previous, large delocalization, the robot likely was unable to recover from this delocalization as indicated by the data's continuing instability through the end of the data set.

Determining that the robot has delocalized relies on comparing the averaged erroneous particle index to a threshold number. The threshold number can be decided a priori during coding, but it is typically beneficial to include some hysteresis in the evaluation of whether a robot is localized. For example, looking at the latter portion of the data set illustrated in FIG. 8, the variability of the averaged verification particle indices reaches a high number several times, but, in each instance, it drops again after only a few iterations. A proper evaluation of whether a robot has recovered from a delocalization event should not look only at instantaneous values, but also should evaluate whether the averaged index returns to a high value and remains stable at a high value for a period of time sufficient to demonstrate that the robot likely has successfully re-localized. The necessary minimum duration can also be defined in the code.

2. Treatment of Dynamic Areas of the Map

One of the challenges confronting a robot engaged in creation and update of maps of its surroundings is the potential mix of static and dynamic elements within its surroundings. While it is generally expected that most of a robot's surroundings will remain fixed, a robot should be prepared to function within an environment in which people, pets, etc. may be moving.

Newly encountered, unmapped space may contain a mix of dynamic and static elements. Making a distinction between the robot's identification of potentially dynamic areas of the map and those that are static is essential for building useful and accurate maps for the robot to use.

In an embodiment, the issue of distinguishing between static (permanent) elements of the robot's surroundings and dynamic (transient) elements may be addressed in the following way:

1) The robot may create an abstraction of its environment (a map) within a grid-space of cells available in memory, each cell containing a number that indicates a relative probability of whether the space within the cell is empty or occupied. These values may range from, for example, zero (empty) to 254 (occupied), with an initial condition value within every cell of 127 (i.e., a value in the middle of the spectrum).

2) A spatial sensor, most conveniently a laser rangefinder, may scan the robot's surroundings, measuring distances to boundaries and other objects. This data stream may provide the base information from which the robot can determine the probability that a cell is occupied or not. For example, if the spatial sensor measures a distance to a wall, the occupancy probability that the cell on the robot-generated map corresponding to that point along the wall is occupied increases while the occupancy probability for all the cells along the measurement vector between the robot and the wall decreases (because the wall was the first object detected). With repeated measurement from the spatial sensor, the probabilities may become more certain.

3) If a cell currently identified as empty has an occupancy probability that is changing (e.g., appearing suddenly to be occupied), it may signify a potentially dynamic area of the map.

4) If such cells are detected, they may be marked so as to not be updated with regard to their likelihood of containing an obstacle while they are dynamic. Similarly, this also can extend to an arbitrary zone surrounding these cells.

Figure 9:
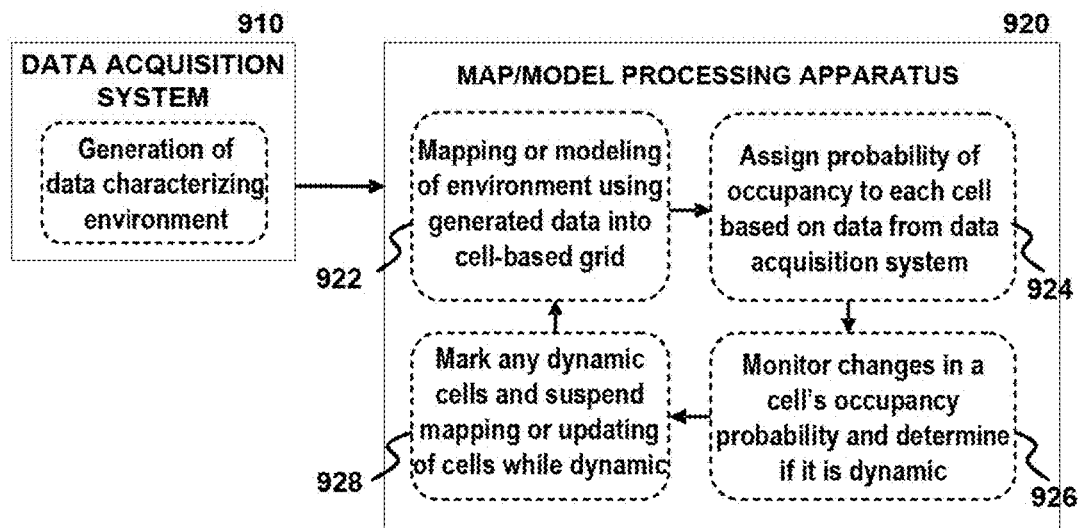
FIG. 9 depicts a block diagram of a data acquisition system and map/model processing apparatus in accordance with one embodiment of the present invention.

FIG. 9 is a diagram of a system containing other features of the invention. In FIG. 9, a data acquisition system 910 generates data regarding the physical environment of a mobile device such as a robot. The data generated by the data acquisition system provides input to a map/model processing apparatus 920. The map/model processing apparatus 920 generates and maintains a map in a cell-based grid form (block 922) and assigns a probability of occupancy to each cell (block 924) based on the data received from the data acquisition system. Additionally, the map/model processing unit monitors individual cells (block 926) for changes in their probability of occupancy. Based on the detection of such changes, the processing unit determines if any cells are dynamic. If cells are determined to be dynamic, they are marked accordingly (block 928). Mapping or updating of such cells is suspended for the period that they are in a dynamic state.

Figure 10:
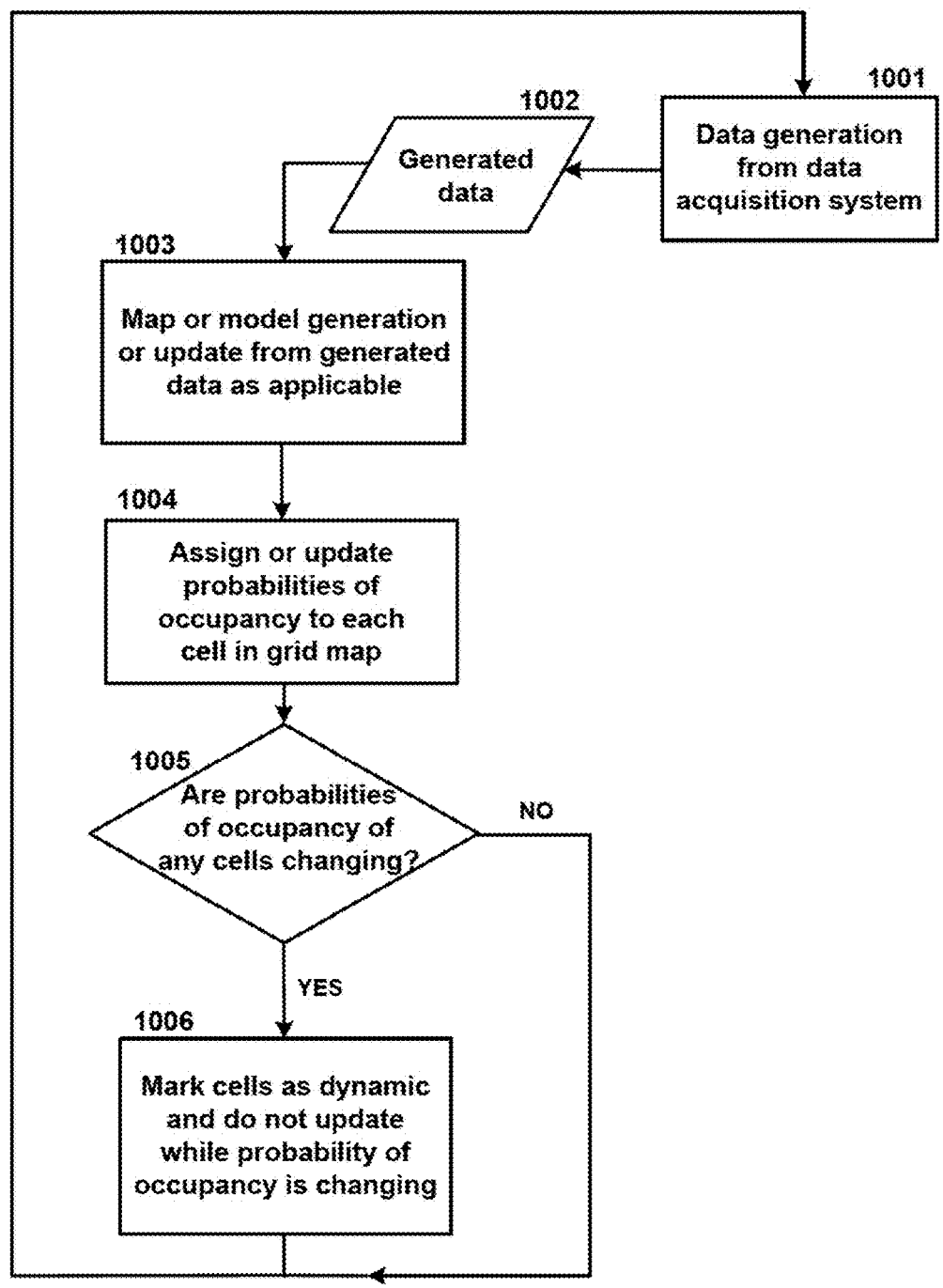
FIG. 10 depicts a flow of operation of the system and apparatus in FIG. 9 assigned probabilities of cell occupancy to determine whether a cell is a dynamic cell.

FIG. 10 depicts a flow of operation of the embodiment shown in FIG. 9. In FIG. 10, at block 1001, the data acquisition system generates data regarding the robot's physical environment, yielding the generated data at block 1002. At block 1003, the generated data is used to generate or update the map of the robot's physical environment. At block 1004, probabilities of occupancy for each cell in the grid map are assigned or updated. At block 1005, it is determined whether probabilities of occupancy of any of the cells are changing. If they are not, then flow returns to block 1001. If they are, then at block 1006, the cells whose probabilities of occupancy are changing are marked as dynamic so that they are not updated while probability of occupancy is changing. Flow then returns to block 1001.

Addressing Tilt in a Sensor Used to Collect Spatial Data Regarding a Robot's Surroundings Accurate delineation of a robot's surroundings as part of mapping and localization requires maintaining the orientations of the sensors generating spatial data in congruence with the presiding surfaces of the surrounding geometry. For a robot operating inside a building or similar enclosure, this means that a sensor collecting information in two dimensions would preferably maintain its plane of detection as parallel to the floor since the floor would define the dominant plane of motion available to a robot traversing it.

Because floors may have areas of uneven surface or surface discontinuities, or because objects resting on the floor may introduce non-uniformities in a robot's available travel surface, it is possible that a sensor collecting spatial data may not maintain consistent orientation with the presiding surfaces of the surrounding geometry, which can lead to erroneous delineation of the robot's surroundings.

Figure 11:
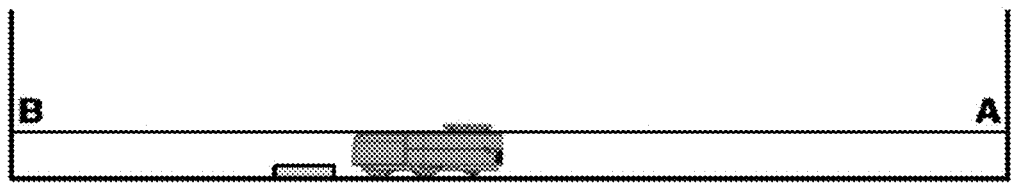
FIG. 11 depicts an example of orientation of a mobile robot in its physical environment.
Figure 12:
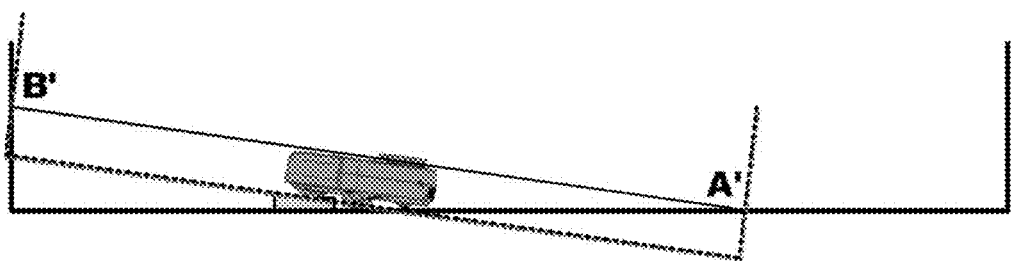
FIG. 12 depicts an example of orientation of a mobile robot in its physical environment when the robot is tilted.

FIGS. 11-12 illustrate the potential problem encountered by a robot collecting spatial data without an ability to detect when its sensor has lost parallel orientation with the floor. In the upper illustration, the robot is traveling away from a physical boundary at A and toward a physical boundary at B. A sensor mounted on the robot in this example is collecting spatial data in a horizontal plane indicated by the thin line positioned at a height near the top of the robot. In the lower illustration, the robot begins traversing an obstacle which tilts the robot backward. If the robot does not recognize that it is no longer collecting data in a plane that is accordant with the surrounding geometry, then the spatial construction developed from the sensor data will not match the actual geometry defined by the robot's surroundings. In this case, the data collection plane's forward incline will distort the previously determined position of the wall at B to one further out, at B'. The backward decline on the data collection plane results in its intersection with the floor, creating the impression that a boundary exists behind the robot at A' rather than at the further position of A.

Often, wheel slip accompanies tilt when a robot traverses a substantive irregularity in a floor surface. This can be particularly problematic if it occurs when the robot is collecting its first data on a new area (e.g., when the robot has turned a corner into an unmapped space) since the distorted image may be incorporated into the map.

For a robot using the continuous generation of spatial boundary information to provide updates to a map, erroneous data generated during a tilt event can propagate into mapping or localization algorithms. The potential results may include some degree of mapping corruption, which frequently can lead to delocalization.

Consequently, it is important to provide a strategy to identify and address tilt conditions during normal operation, and two approaches to same are described below. These approaches are designed such that they can be used separately or together in potential reinforcement.

3. Tilt as Detected and Addressed in Software

Typically, dynamic areas created by people, pets or objects moved or in use by a person will present a dynamic area to mark, one that usually is limited in its footprint. However, if the dynamic area is spread along a relatively wide area, then this may represent a different scenario. For example, if a map boundary area shifts suddenly or moves in a way that many, possibly contiguous cells are tagged as active, then it may be likely that the robot has tilted. In such a case, the spatial sensor's detection plane may be angled such that a portion of the floor near the robot is read as a boundary, as indicated in the example described earlier. When the robot identifies that a dynamic area involves an area larger than would be created by people, pets or moving objects in relative proportion with the former, then the updating of the map may be suspended.

Figure 13:
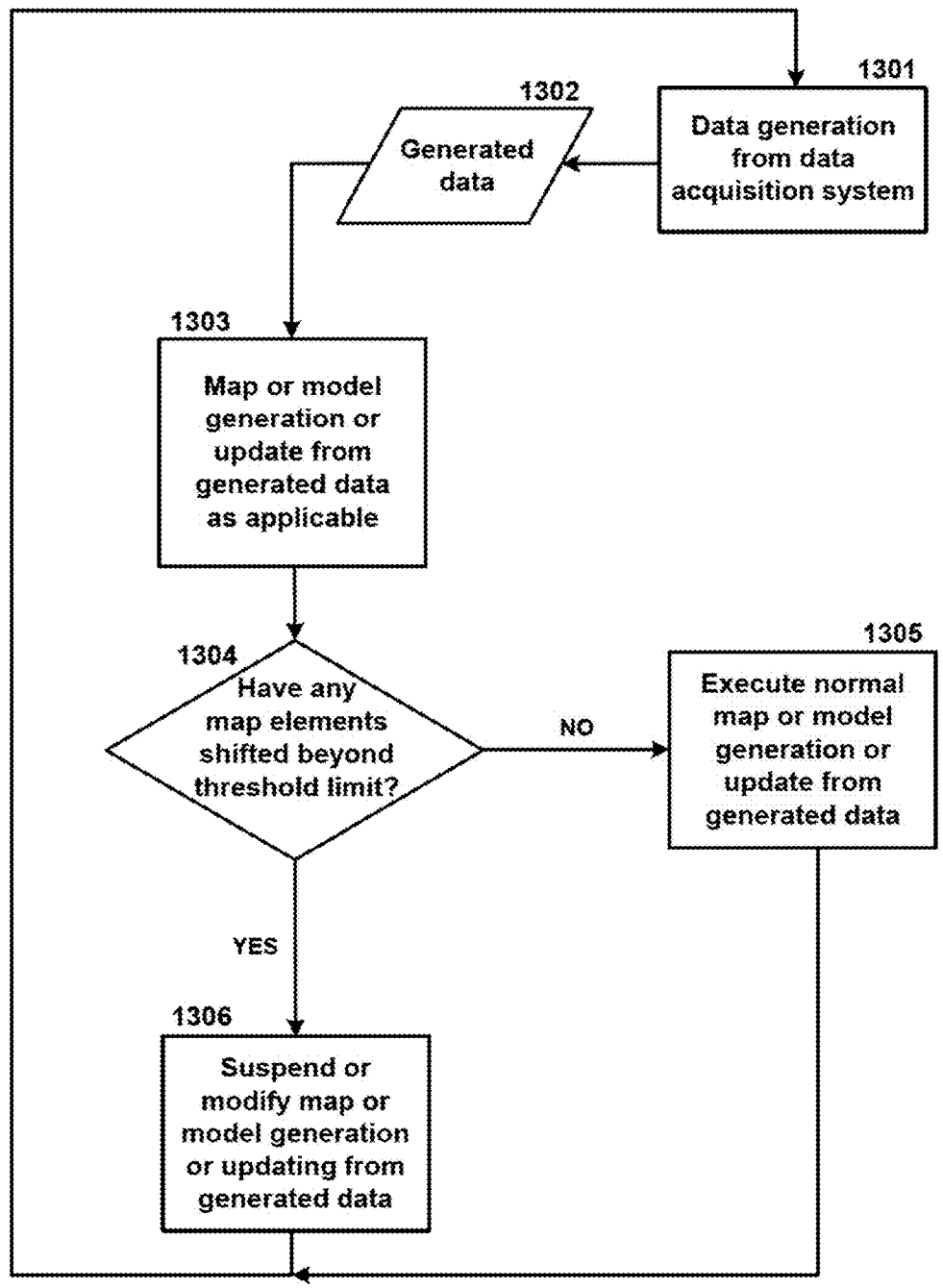
FIG. 13 depicts a flow of operation of the system in FIG. 1 that uses threshold limits for map elements to determine map or model generation.

FIG. 13 depicts a flow of operation of a system as depicted in FIG. 1, with the variant that tilt of the robot is detected and addressed in software. At block 1301, the data acquisition system generates data regarding the robot's physical environment, yielding the generated data at block 1302. At block 1303, the generated data is used to generate or update the map of the robot's physical environment. At block 1304, a check is made to see if any elements of the map (e.g. a map boundary area) has shifted beyond a threshold limit. If not, then at block 1305, map generation or update continues. However, if at block 1304 there has been a shift beyond the threshold limit, then at block 1306, the map generation is suspended, or the map is modified. In this aspect, the instruction to suspend or modify is generated within the processing apparatus, and does not originate from the sensing unit. After either block 1305 or block 1306, flow returns to data generation, so that further checks can be made to see whether the map elements have returned to within threshold limits.

It should be noted that instructions to suspend or modify the use of generated data for mapping need not come solely from the sensing unit or from within the processing apparatus. These respective features of the system depicted in FIG. 1 may operate concurrently.

Figure 14:
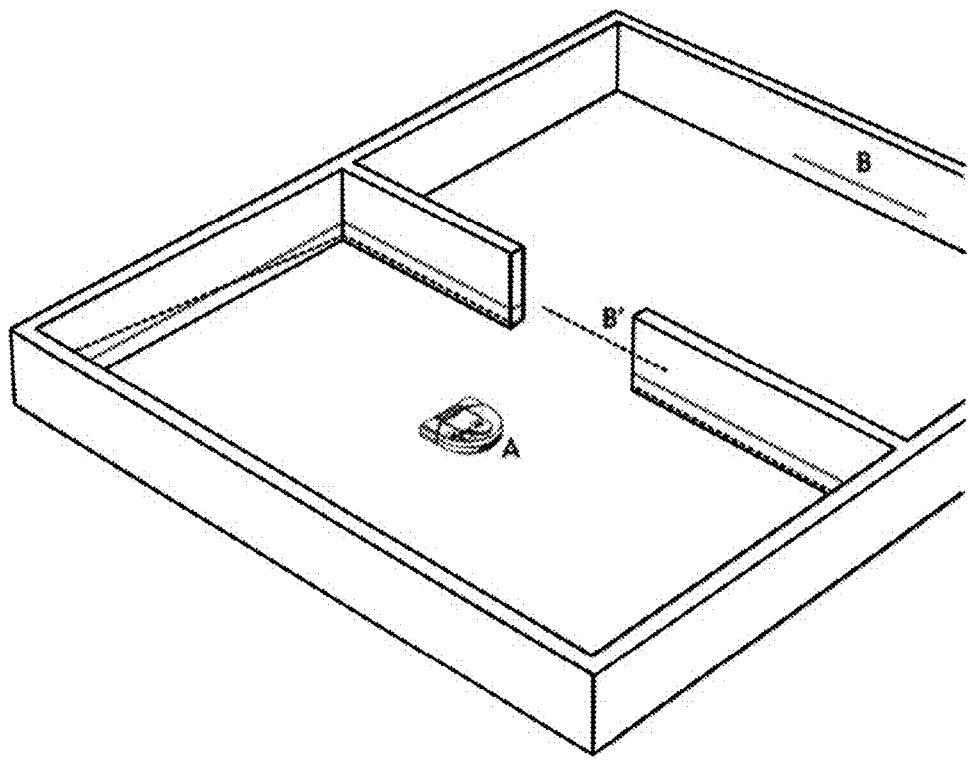
FIG. 14 depicts one scenario of movement and orientation of a mobile robot in its physical environment.

Detection of motion may rely on spatial scanning done by, for example, a laser rangefinder, which may continuously scan a robot's surroundings. When scanning indicates that consecutive distance readings show "dynamic" movement, the spatial distance represented by an aggregate distance, or by a distance differential, may be compared to a pre-defined threshold value. If the difference between the first to the last distance measurement is larger than the threshold, it may be concluded that the robot is tilted. FIG. 14 provides an example of such a scenario. Consider the robot at location A moving through a room and passing a doorway into an adjoining room. Assume that the robot employs a planar spatial sensor enabling it to delineate the physical limits of its surroundings. Such a sensor likely would detect, through the open doorway, some portion of the wall of the adjoining room, which, in the example case, may yield the detected length of wall segment B. If one side of the advancing robot encounters an obstacle such as, for example, a thick rug, that results in the robot straddling the object (e.g., the left wheel(s) may be raised by the rug while the right wheel(s) continues to roll on the floor), then the robot's sensing plane likely will tilt toward its right side. Depending on room geometry and degree of tilt, it is possible that the portion of the sensing plane that had been detecting the wall of the adjoining room at B, now would intersect the floor of the adjoining room at the much closer location of B'. In such a case, as the robot updates the map of its surroundings, the data may show the wall boundary shift suddenly from B to B' while other boundaries might show little or no variation in position. For a robot monitoring sudden changes in consecutive cells—from empty cells at B' during level operation to occupied cells at B' when the robot is tilting—the determination that a tilt event has occurred may be based on a comparison between the physical length represented by the consecutive, newly-"occupied" cells and a pre-defined threshold. If the represented distance, or distance differential, meets or exceeds the threshold, it may be concluded that the robot has tilted and map updating may be suspended.

4. Tilt as Detected and Addressed in Hardware

Detection of tilt in hardware may involve the use of an accelerometer or similar component that may detect changes in the orientation of the component's mounting surface.

With this approach, data generated by the spatial scanner may be supplemented by data regarding changes in orientation. With this latter data set providing contextual verification for the spatial sensor's data, information collected while the tilt-detecting component indicates that the spatial sensor has lost its preferred orientation could be discarded. In a typical embodiment, this data may be discarded before it is processed by any localization or mapping software.

Figure 15:
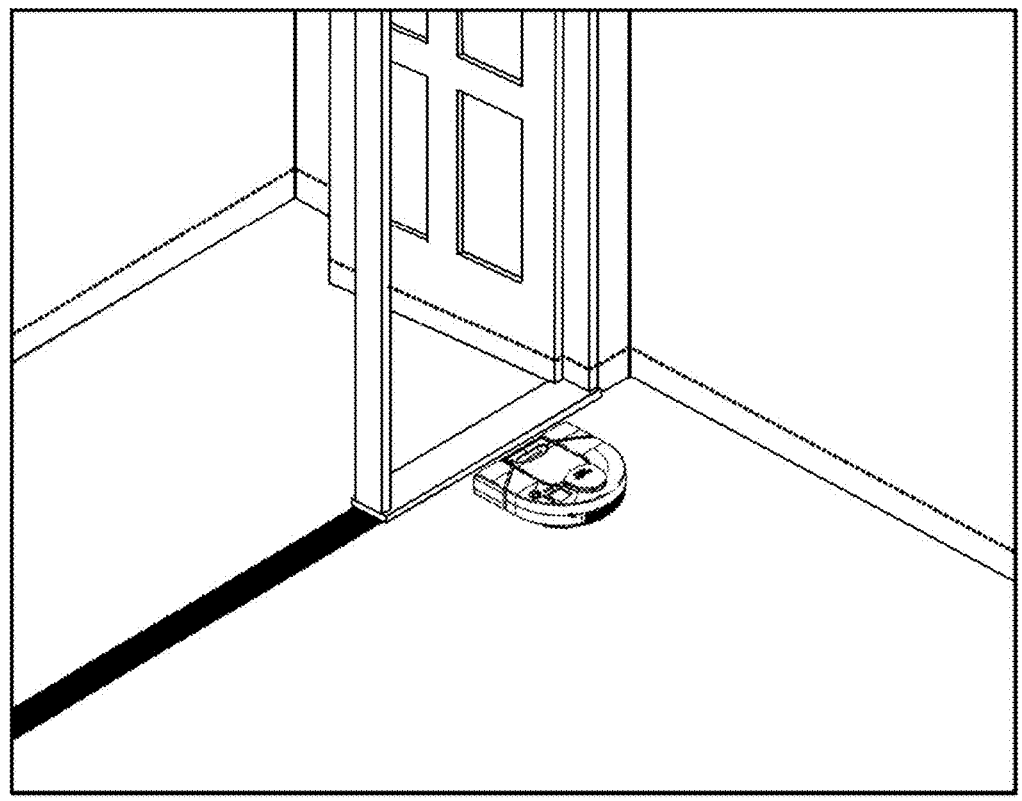
FIG. 15 depicts a scenario of movement and orientation of a mobile robot in its physical environment in the presence of an obstacle.

As depicted in FIG. 15, a robot uses a sensor generating 2D spatial information in a horizontal plane from the robot's surroundings. The dotted line indicates the sensing perimeter, created by the spatial sensing plane intersecting objects surrounding the robot. This perimeter informs the robot of nearby obstacles and the boundaries presented by walls and doors.

Figure 16:
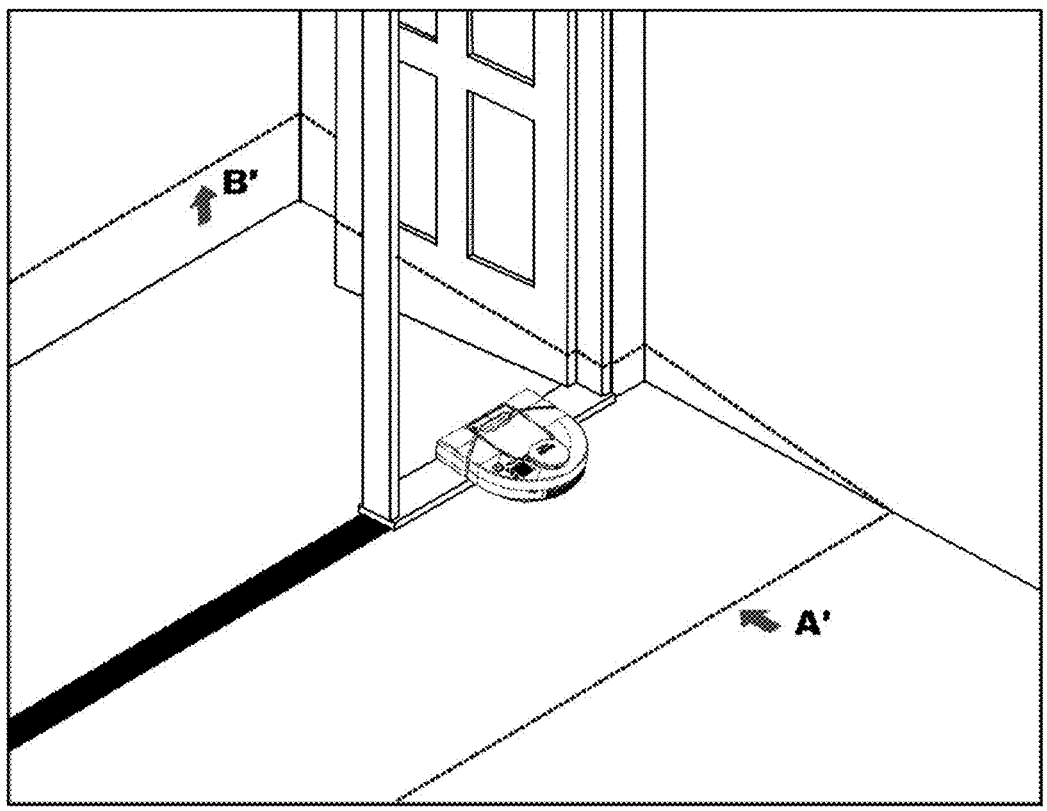
FIG. 16 depicts a scenario of movement and orientation of a mobile robot in its physical environment when the robot is tilted.

As depicted in FIG. 16. if the robot traverses a low obstacle, such as the door frame shown in FIG. 16, or an uneven surface, then the robot may lose its parallel disposition with respect to the floor. As a result, a sensor fixed to the robot collecting spatial information regarding the robot's surroundings may collect data at an angle away from horizontal. The dotted line in FIG. 16 shows the intersection of the spatial sensor's plane of detection with object surfaces surrounding the robot. With the robot tilted, the generated spatial data becomes erroneous. The calculated distance to the wall in front of the robot becomes distorted as the detection plane at B' intersects the wall at a higher point, but, more critically, the detection plane's intersection with the floor behind the robot would incorrectly report a linear boundary at A'.

Several features and aspects of the present invention have been illustrated and described in detail with reference to particular embodiments by way of example only, and not by way of limitation. Reference herein to "one embodiment" or "an embodiment" means that a particular feature, structure, operation, or other characteristic described in connection with the embodiment may be included in at least one implementation of the invention. However, the appearance of the phrase "in one embodiment" or "in an embodiment" in various places in the specification does not necessarily refer to the same embodiment. It is envisaged that the ordinarily skilled person could use any or all of the above embodiments individually, or in any compatible combination or permutation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A mobile device tracking system for a mobile device in its physical environment comprising:
   a spatial sensor mounted on the mobile device and configured to scan the physical environment and generate spatial data indicating distances to boundaries and objects from a current position of the mobile device;
   a map generator mounted on the mobile device and configured to generate and update a map from the spatial data, the map including the current position of the mobile device; and
   a delocalization detector configured to generate a current estimate by estimating the current position within said map by generating position particles indicating at least one of position and orientation of the mobile device within its physical environment, the delocalization detector being further configured to generate and iteratively maintain a data set of said position particles to track a changing position of the mobile device within its physical environment, the delocalization detector including:
   i. a particle weight assignor that assigns a weight to each position particle, the particle weight being a relative measure of the likelihood that the position particle accurately represents the current position with respect to other particles;
   ii. an erroneous particle generator that introduces erroneous particles having weights that are uniformly low with respect to the weights of the position particles; and
   iii. a particle weight comparator that compares the weights of the erroneous particles and the weights of the position particles and determines that the mobile device has become delocalized when a substantial number of erroneous particles have weights that are no longer uniformly low with respect to the weights of the position particles.

2. A mobile device tracking system as claimed in claim 1, wherein the erroneous particle generator selects erroneous particles so as to avoid introduction of additional error into the current estimate of the current position.

3. A mobile device tracking system as claimed in claim 1, wherein the mobile device is a robot.

4. A mobile device tracking system as claimed in claim 1, wherein the particle weight comparator is further configured to calculate and monitor the averaged weight or the median weight of the erroneous particles over multiple iterations.

5. A mobile device tracking system as claimed in claim 1, wherein the erroneous particles comprise erroneous position particles indicating position of the current position of the mobile device.

6. A mobile device tracking system as claimed in claim 5, wherein the particle weight comparator is further configured to determine the accuracy of the current position.

7. A mobile device tracking system as claimed in claim 1, wherein the erroneous position particles comprise erroneous inclination particles indicating orientation of the mobile device.

8. A mobile device tracking system as claimed in claim 7, wherein the particle weight comparator is further configured to determine the accuracy of the orientation of the mobile device.

9. A mobile device tracking system as claimed in claim 8, wherein the particle weight comparator is further configured to determine when a tilt event has occurred.

10. A method for controlling movement of a mobile device, the method comprising:
    tracking, with a sensor, movement of the mobile device;
    generating, with a map generator, a map of the mobile device's physical environment, said generating occurring with one of concurrently with and prior to tracking the current position of the mobile device;
    updating, with the map generator, said map with one of concurrently with and prior to tracking the mobile current position;
    estimating, with a delocalization detector, the mobile current position within said map by generating position particles, each of said position particles representing one of a potential position and orientation of the mobile device within its physical environment, wherein a data set of said position particles is generated and maintained iteratively to track changing position of the mobile device within its physical environment, said estimating including:
    i. assigning a weight to each position particle, the particle weight being a relative measure of the likelihood of the position particle accurately representing the current mobile position with respect to other position particles; and
    ii. introducing erroneous particles having weights that are uniformly low with respect to the weights of the position particles; and
    iii. comparing the weights of the erroneous particles and the weights of the position particles to determine that the mobile device has become delocalized when a substantial number of erroneous particles have weights that are no longer uniformly low with respect to the weights of the position and controlling movement of the mobile device in accordance with the steps of tracking, updating, and estimating.

11. A method as claimed in claim 10, wherein the erroneous particles are selected so as to avoid introduction of additional error into the current estimate of the position of the mobile device.

12. A method as claimed in claim 10, wherein the mobile device is a robot.

13. A method as claimed in claim 10, wherein estimating the current position includes calculating and monitoring the averaged weight or the median weight of the erroneous particles over multiple iterations.

14. A method as claimed in claim 10, wherein the erroneous particles comprise erroneous position particles indicating position of the mobile device.

15. A method as claimed in claim 14, wherein estimating the current position includes determining the accuracy of the current position.

16. A method as claimed in claim 10, wherein the erroneous position particles comprise erroneous inclination particles indicating inclination of the mobile device.

17. A method as claimed in claim 16, wherein estimating the current position includes determining accuracy of inclination of the mobile device.

18. A method as claimed in claim 17, wherein determining accuracy of inclination includes determining when a tilt event has occurred.

* * * * *